Patented Dec. 17, 1946

2,412,652

UNITED STATES PATENT OFFICE 2,412,652

PROCESSES RELATING TO THE PRODUCTION OF BOARD AND THE PRODUCT RESULTING THEREFROM

Fritz Rosenthal, Indianapolis, Ind., assignor to The University of Tennessee Research Corporation, Knoxville, Tenn., a corporation of Tennessee No Drawing. Application May 14, 1943, Serial No. 487,068

9 Claims. (Cl. 260—9)

This invention relates to the production of a board in which comminuted vegetable products of lignin and cellulose, and particularly cottonseed hulls comminuted to a specific particle size, are impregnated with a resinous binder and treated under the influence of heat and pressure.

Heretofore excellent board has been made using comminuted cottonseed bran and comminuted cottonseed fibers with preliminary impregnation with a specific amount of phenolic resin and under pressures ranging from 2000–4000 pounds per square inch; and indeed excellent board has been made using these ingredients without added phenolic resin under the same pressures of from 2000–4000 pounds per square inch.

Efforts to reduce the cost of production of board composed of these constituents by reducing the pressures to from 600–1000 pounds per square inch failed because, with the board having the added phenolic resin, the impregnation was not uniform; and further the board warped or cracked within two or three weeks. With respect to the board having no added resin the product resulting from pressures of from 600–1000 pounds per square inch was deficient in flow and practically useless.

Pressures ranging between 2000–4000 pounds per square inch are too high to produce boards of large surface since the pressed surface is dependent on the pressing equipment that is commercially available; and irrespective of the availability of such equipment the cost per square inch of pressed surface increases in proportion to the pressure that is required to produce the board.

The objects of the present invention are to secure cheaply and simply from cottonseed hulls as a filler board made with resinous materials, in which warping or cracking will be minimized, and which will have the desired strength and uniformity; and the essence of the present invention is the production of such a board under reduced pressures of from 600–1000 pounds per square inch, thus materially lowering the pressure and other costs.

Cottonseed bran and cottonseed fibers are the two constituents of cottonseed hulls; and while the presence of cottonseed fiber is highly desirable when pressures of from 2000–4000 pounds per square inch are employed, and is an important element in the strength of products so formed, it is the presence of such fibers with the comminuted bran that is responsible for the lack of uniformity in products formed under low pressures of from 600–1000 pounds per square inch. I have discovered that to secure uniformity in the production of such low pressure products the fiber component must be separated and eliminated from the fiber-containing cottonseed hulls prior to impregnating the comminuted bran with the resin.

The lack of uniformity was partly due to the difference in bulk or apparent density between the bran and fiber constituents, and partly due to differences in absorbing power for resin of the bran and fiber. When a low pressure of from 600–1000 pounds per square inch was applied to a composition comprising resin-impregnated comminuted hulls containing bran and fiber, as contrasted to the action when a high pressure of from 2000–4000 pounds per square inch is applied, the difference in bulk between bran and fiber manifested itself in an unequal distribution of pressure and hence in a pressed board which was not uniform. The reduction in pressure also caused a reduction of the force with which the phenolic binder was driven into the filler, and hence the hull fiber which is the component of higher absorbing power received comparatively less coating under low pressure than under high pressure.

While the substitution of fiberless hull bran for the fiber-containing hulls overcame the lack of uniformity it did not eliminate the tendency of the board produced under pressures of from 600–1000 pounds per square inch to warp or crack. This tendency to warp or crack is presumed to be due to conditions of interior stress within the board; and while these conditions are not present when high pressures of from 2000–4000 pounds per square inch are used with the above indicated constituents they are present when low pressures of from 600–1000 pounds per square inch are applied to the same constituents.

I have discovered that low pressures of from 600–1000 pounds per square inch can be used in the production of satisfactory board characterized by a minimum of warping or cracking if the proper binder is used, and that it is the nature of the binder that governs the tendency of board produced under such low pressures to warp or crack. I have further discovered that if the phenolic resin binder which I use in the production of board with high pressures of from 2000–4000 pounds per square inch is replaced by a resinous composition containing oxidized abietic acid there will be secured a board characterized by a minimum of warping and cracking under low pressures of from 600–1000 pounds per square inch. I have produced a satisfactory board so characterized by the use of an oxidized abietic acid composition derived from long leaf yellow pine and sold in emulsion form, under the trade name of "Vinsol," the emulsion containing approximately 40% resin solids and 60% water and an emulsifying agent. This pine resin is substantially insoluble in petroleum hydrocarbons and has a methoxy content of 3 to 7% (Condensed Chemical Dictionary, 3rd edition, p. 662). It is prepared in the manner described in the patent to Hall 2,193,026, namely by extraction from pine wood by a coal tar hydrocarbon followed by removal of the material soluble in light petroleum hydrocarbons. A substantial component of this resin and from which the novel process is believed to benefit has been identified as oxidized abietic acid. There will be involved in the production of this board not only the economies derived from the use of lower pressures and the lower cost of "Vinsol" which is much cheaper than the phenolic resin binders. This board so constituted and produced will, however, lack strength which requires the presence, among other things, of the phenolic resin; but if strength is unimportant and the characteristics of uniformity, substantial reduction of warping and cracking are the desired ones they will be secured by the use as a binder with fiberless cottonseed bran of the "Vinsol" resinous composition consisting essentially of oxidized abietic acid. In this connection I have secured satisfactory results by the procedure of Example 1 as follows:

56 pounds of comminuted fiber-free cottonseed hull bran are mixed with ten pounds of "Vinsol Emulsion Type 48" (this quantity of emulsion contains four pounds of oxidized abietic acid) in a steam-jacketed vacuum mixer. A vacuum of 23" is applied and low pressure steam passed through the jacket. Dehydration is complete when the temperature of the compound reaches 140° F., as measured by means of a thermocouple inside the mixer. The composition is then placed in a tray in a depth proportionate to the desired thickness of the board. The tray is placed between the platens of a press which are heated to approximately 300° F. and a pressure ranging from 600 to 1000 pounds per square inch is applied. The platens are chilled with water as soon as the full pressure of 1000 pounds per square inch is reached, and the pressure is released when the temperature of the platen is reduced to 120° F.

I have further discovered that the strength of the board decreases as the proportion of the oxidized abietic acid composition to the phenolic resin increases, and increases as the proportion of the oxidized abietic acid composition to the phenolic resin decreases; and that strong board is secured characterized by a minimum of warping and cracking when the proportions are used of one part "Vinsol" to three parts phenolic resin. In this connection I have secured satisfactory results by the procedure of Example 2 as follows:

56 pounds of comminuted fiber-free cottonseed hull bran are mixed with 2.5 pounds of "Vinsol Emulsion Type 48" (this quantity of emulsion contains one pound of oxidized abietic acid) and six pounds of a phenolic resin varnish, containing 50% (i. e. 3 pounds) phenol-formaldehyde resin in a steam-jacketed vacuum mixer. The dehydration in the vacuum mixer as well as the pressing between heated platens at 600 to 1000 pounds per square inch is carried out in exactly the same fashion as outlined in Example 1.

The present invention is susceptible to different variations and embodiments within the limits of the appended claims; and it is to be understood that the pressure, ingredients and proportions thereof may be varied to secure the desired characteristics with respect to strength, uniformity, warping and cracking.

What is claimed is:

1. The method of forming a board which comprises comminuting cottonseed hull bran, mixing therewith a resinous composition derived from pine wood by extraction with a coal tar hydrocarbon which composition is substantially insoluble in petroleum hydrocarbons, has a methoxy content of 3 to 7%, and contains oxidized abietic acid, and subjecting the resulting mass to heat and pressure until a homogeneous board is produced.

2. The method of forming a board which comprises comminuting cottonseed fiberless bran, mixing therewith a resinous composition derived from pine wood by extraction with a coal tar hydrocarbon which composition is substantially insoluble in petroleum hydrocarbons, has a methoxy content of 3 to 7%, and contains oxidized abietic acid, and subjecting the resulting mass to approximately 300° F. heat and pressure up to 1000 pounds per square inch until a homogeneous board is produced.

3. The method of forming a board which comprises comminuting cottonseed hull bran, mixing therewith a resinous composition in which the ratio of resin solids to the bran is approximately one to fourteen, said composition being derived from pine wood by extraction with a coal tar hydrocarbon and being substantially insoluble in petroleum hydrocarbons, has a methoxy content of 3 to 7%, and contains an oxidized abietic acid resin, and a phenol-formaldehyde resin in the proportions of not more than three parts of the phenol-formaldehyde resin to one part of the oxidized abietic acid resin, and subjecting the resulting mass to approximately 300° F. heat and pressure up to 1000 pounds per square inch until a homogeneous board is produced.

4. The method of forming a board which comprises comminuting cottonseed hull bran, mixing therewith a resinous composition derived from pine wood by extraction with a coal tar hydrocarbon which composition is substantially insoluble in petroleum hydrocarbons, has a methoxy content of 3 to 7%, and contains oxidized abietic acid, in which the ratio of resin solids to the bran is approximately one to fourteen, and subjecting the resulting mass to heat and pressure until a homogeneous board is formed.

5. The method of forming a board which comprises comminuting cottonseed hull bran, mixing therewith a mixture of phenol-formaldehyde resin and a resinous composition derived from pine wood by extraction with a coal tar hydrocarbon which composition is substantially insoluble in petroleum hydrocarbons, has a methoxy content of 3 to 7%, and contains oxidized abietic acid, in the proportions of not more than three parts of phenol-formaldehyde resin to one part of the oxidized abietic acid resin, and subjecting the resulting mass to heat and pressure until a homogeneous board is formed.

6. A board characterized by a minimum of warping and cracking composed of comminuted cottonseed hull bran and a resinous composition derived from pine wood by extraction with a coal tar hydrocarbon which composition is substantially insoluble in petroleum hydrocarbons, has a methoxy content of 3 to 7%, and contains oxidized abietic acid.

7. A uniform board characterized by a minimum of warping and cracking composed of comminuted cottonseed fiberless bran and a resinous composition derived from pine wood by extraction with a coal tar hydrocarbon which composition is substantially insoluble in petroleum hydrocarbons, has a methoxy content of 3 to 7%, and contains oxidized abietic acid, in which the ratio of resin solids to the bran is approximately one to fourteen.

8. A uniform, strong board characterized by a minimum of warping and cracking composed of comminuted cottonseed fiberless bran and a resinous composition derived from pine wood by extraction with a coal tar hydrocarbon which composition is substantially insoluble in petroleum hydrocarbons, has a methoxy content of 3 to 7%, and contains oxidized abietic acid, and phenol-formaldehyde resin in the proportions of not more than three parts of the phenol-formaldehyde resin to one part of the oxidized abietic acid resin.

9. A uniform, strong board characterized by a minimum of warping and cracking composed of comminuted cottonseed fiberless bran, a resinous composition derived from pine wood by extraction with a coal tar hydrocarbon which composition is substantially insoluble in petroleum hydrocarbons, has a methoxy content of 3 to 7%, and contains oxidized abietic acid, and phenol-formaldehyde resin, the ratio of resin solids in the composition to the bran being approximately one to fourteen, and the phenol-formaldehyde resin being in the proportion of not more than three parts to one part of the oxidized abietic acid resin.

FRITZ ROSENTHAL.